(12) United States Patent
Schmidt et al.

(10) Patent No.: US 8,840,193 B2
(45) Date of Patent: *Sep. 23, 2014

(54) WHEEL ASSEMBLY FOR MOTOR VEHICLES

(71) Applicant: Bayerische Motoren Werke Aktiengesellschaft, Munich (DE)

(72) Inventors: Roland Schmidt, Stockdorf (DE); Johann Dudkowiak, Poecking (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/782,581

(22) Filed: Mar. 1, 2013

(65) Prior Publication Data

US 2013/0175849 A1 Jul. 11, 2013

Related U.S. Application Data

(63) Continuation of application No. PCT/EP2010/062900, filed on Sep. 2, 2010.

(51) Int. Cl.
*B60T 1/06* (2006.01)
*B60B 27/00* (2006.01)
*F16D 65/12* (2006.01)
*B60B 27/06* (2006.01)
*B60B 3/14* (2006.01)
*F16D 65/02* (2006.01)

(52) U.S. Cl.
CPC ........... *B60T 1/065* (2013.01); *B60B 2310/316* (2013.01); *B60B 27/0031* (2013.01); *B60Y 2200/10* (2013.01); *F16D 2065/1372* (2013.01); *F16D 65/12* (2013.01); *F16D 2065/138* (2013.01); *B60B 27/065* (2013.01); *B60B 3/14* (2013.01)
USPC ........... 301/6.8; 301/105.1; 188/18 A; 188/26

(58) Field of Classification Search
CPC ...... B60B 3/14; B60B 3/142; B60B 27/0015; B60B 27/0021; B60B 27/0031; B60B 3/041; B60B 3/085; B60B 21/025; B60B 27/0052; B60B 27/0063; B60T 1/065
USPC ............. 301/6.1, 6.3, 6.7, 6.8, 105.1, 95.104; 188/18 A, 218 XL, 26

See application file for complete search history.

(56) References Cited

U.S. PATENT DOCUMENTS 2,906,558 A * 9/1959 Forbush ...................... 301/35.63
3,009,742 A * 11/1961 Rabe et al. ............... 301/35.627

(Continued)

FOREIGN PATENT DOCUMENTS

| DE | 34 46 437 A1 | 7/1986 |
|---|---|---|
| DE | 36 36 243 A1 | 5/1988 |

(Continued)

OTHER PUBLICATIONS

International Search Report dated Feb. 14, 2011 including English-language translation (Six (6) pages).

*Primary Examiner* — Kip T Kotter
(74) *Attorney, Agent, or Firm* — Crowell & Moring LLP

(57) ABSTRACT

A wheel assembly configured for suspending the wheel of a motor vehicle on one side and includes a brake disc, which is part of a disc brake and which is fixed, when viewed in the radial direction, to a wheel disc on the outer circumference of the wheel assembly in close vicinity to a wheel rim. A brake caliper of the disc brake surrounds the brake disc over the inner circumference of the brake disc and is fixed to a wheel carrier that supports a stationary ring of a wheel bearing, which has a rotating ring that supports a wheel hub that is connected to the wheel disc in a rotationally and axially fixed manner. The connection of the wheel disc to the wheel hub is formed by a press fit connection or by a spur toothing connection, in particular a Voith Hirth coupling.

10 Claims, 4 Drawing Sheets

(56) References Cited

U.S. PATENT DOCUMENTS

| | | | |
|---|---|---|---|
| 3,051,271 A * | 8/1962 | Spannagel et al. | 188/18 A |
| 3,586,132 A * | 6/1971 | Tantlinger | 188/18 A |
| 3,940,159 A | 2/1976 | Pringle | |
| 4,159,832 A * | 7/1979 | Inbody | 280/124.126 |
| 4,226,304 A * | 10/1980 | Erdmann | 188/18 A |
| 4,234,236 A * | 11/1980 | Inbody | 301/6.7 |
| 4,282,952 A * | 8/1981 | Bartley | 188/18 A |
| 4,343,380 A * | 8/1982 | Kawaguchi | 188/18 A |
| 4,700,813 A | 10/1987 | Rath | |
| 4,716,993 A * | 1/1988 | Bass | 188/18 A |
| 4,893,960 A | 1/1990 | Beier et al. | |
| 6,666,303 B2 | 12/2003 | Torii et al. | |
| 7,857,520 B2 * | 12/2010 | Langer et al. | 384/544 |
| 2008/0073165 A1 | 3/2008 | Rau et al. | |
| 2008/0143170 A1 | 6/2008 | Baumgartner | |
| 2010/0176651 A1 * | 7/2010 | Thomas et al. | 301/6.8 |

FOREIGN PATENT DOCUMENTS

| | | |
|---|---|---|
| DE | 101 32 429 A1 | 2/2002 |
| DE | 10 2004 045 327 A1 | 3/2006 |
| EP | 0 183 748 A1 | 6/1986 |
| WO | WO 85/05661 A1 | 12/1985 |
| WO | WO 2005/123418 A1 | 12/2005 |
| WO | WO 2008/006339 A1 | 1/2008 |

* cited by examiner

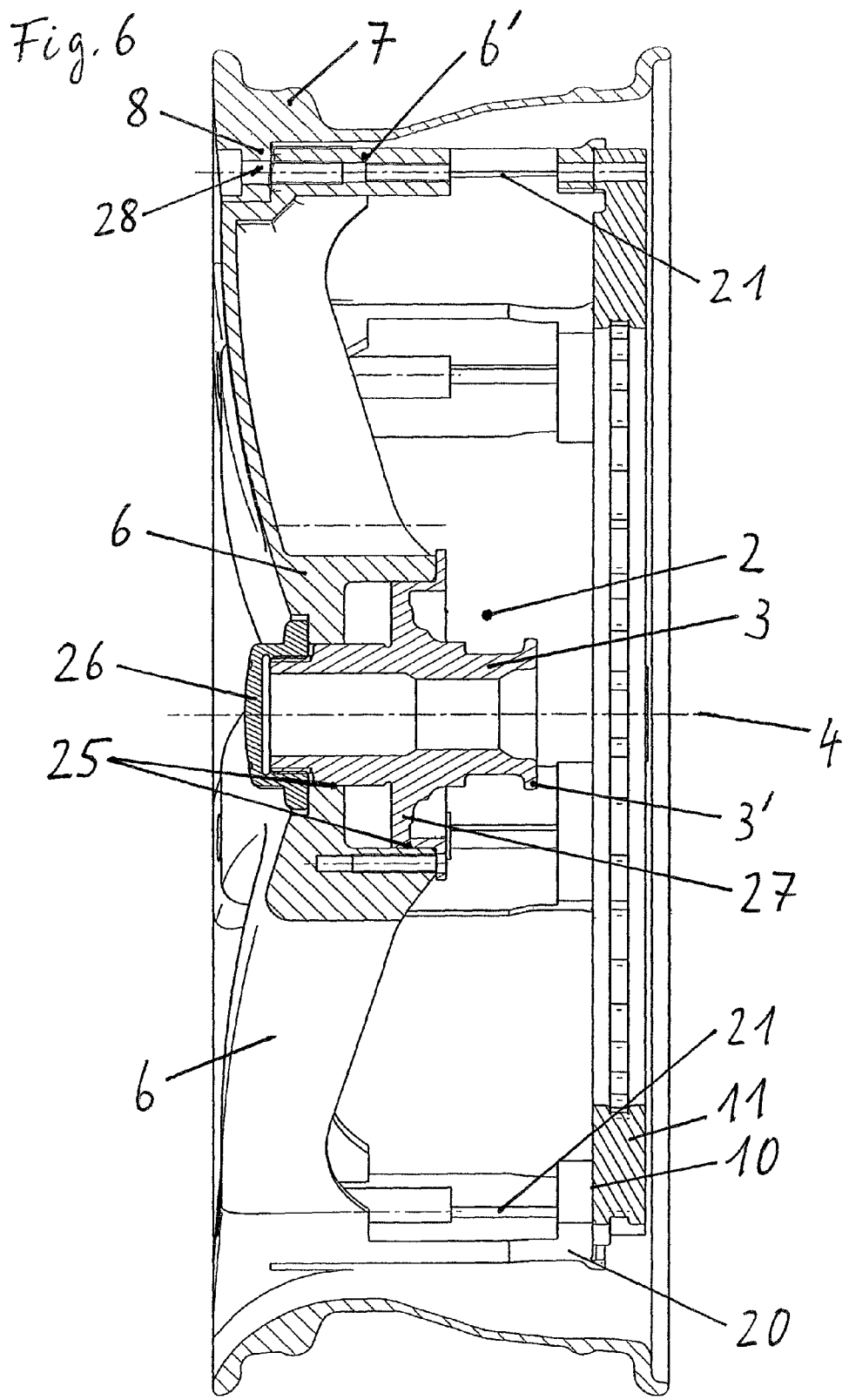

WHEEL ASSEMBLY FOR MOTOR VEHICLES

CROSS REFERENCE TO RELATED APPLICATIONS

This application is a continuation of PCT International Application No. PCT/EP2010/062900, filed Sep. 2, 2010, the entire disclosure of which is herein expressly incorporated by reference.

This application contains subject matter related to U.S. application Ser. No. 13/782,769, entitled "Wheel Assembly for Motor Vehicles," filed on even date herewith.

BACKGROUND AND SUMMARY OF THE INVENTION

The invention relates to a wheel assembly for a motor vehicle and, in particular, a wheel assembly that is configured for suspending the wheel of a motor vehicle on one side and that includes a brake disc which is part of a disc brake and which is fixed, when viewed in the radial direction, to a wheel disc on the outer circumference of the wheel assembly in close vicinity to a wheel rim.

A construction of a conventional wheel and its bearing consists of the following components: a wheel bearing, a wheel hub having a wheel mounting flange and a wheel rim with a tire. The wheel rim is fastened to the wheel mounting flange by use of wheel screws in such a way that the brake disc is clamped between the rim and the wheel mounting flange. Such a wheel bearing arrangement is described in DE 101 32 429 A1. In this case, the maximum friction radius of the brake disc is determined by the following chain of measurements: the inner radius of the wheel rim minus the height of the brake caliper bridge minus half the lining height. Therefore, in the case of high powered vehicles it is often necessary to use a larger rim in order to accommodate the required size of the brake disc.

When dimensioning the brake disc, a goal should be to make the friction radius as large as possible, because it reduces the clamping force of the brake caliper and, thus, its weight. The brake caliper bridge can be dimensioned smaller; and the hydraulic piston can be correspondingly smaller. However, with an increasing diameter of the brake disc, the weight of the brake disc also increases.

However, it is also possible to achieve a large friction radius if the brake caliper surrounds or grips the brake disc from a radially inner side. That is, the height of the brake caliper bridge is excluded from the chain of measurements. This necessitates that the brake disc be fastened to the rim or that the wheel mounting flange, or more specifically the wheel disc, has to be designed approximately as large as the inside diameter of the rim of the wheel and that the internally surrounded brake disc be fastened thereto.

Such a design is described in EP 018 37 48 A1 as a wheel assembly having a disc brake that is configured for vehicles and includes a disc carrier, which has the shape of a cup and has a base member secured to a wheel hub, as well as a drum member, which extends axially inwards at a small radial spacing from a wheel rim and is securely connected to the radially outer edge of a brake disc. Furthermore, a stationary housing of the wheel bearing supports a brake caliper, which is supported at the radially inner edge of the brake disc, supports the brake pads, which are arranged on both sides of the brake disc and has an actuating device on at least one side of the brake disc. Ventilating channels are present radially inside the wheel rim.

To date, an internally surrounded brake disc that is fixed to the rim was known only on motorcycles. The background is that in this case, as compared to an automobile, no significant lateral forces are generated. The wheel bearings sit directly in the wheel, so that the brake disc receptacle can be manufactured with close tolerance to the bearing seats. In contrast, in the case of single sided wheel suspensions the production tolerances and the deformation of the rim under lateral force are the factors contributing to the elimination of a lateral run-out of a brake disc that is fixed to the rim. The brake pads are pushed back, so that when the brake is applied, the result is an unacceptable dead stroke until the brake pads engage again. In addition, rotational vibrations of the steering wheel are generated. The lateral run-out is controlled by manufacturing the wheel hub flange and the brake disc very precisely. Only the deformation between the wheel carrier and the wheel hub flange has an effect on the lateral run-out. If an internally surrounded brake disc were to be fastened to a conventional rim of such a single sided wheel suspension, then the distortion of the rim alone would exceed the permissible tolerances due to the uneven tightening of the wheel screws.

Changing the wheel with a brake disc that is fixed to the rim is much more difficult, because the disc has to be extracted from the brake caliper during the disassembly and then reinserted into the brake caliper during the assembly. The risk of a human error occurring during assembly or, for example, the risk of applying the brake when the brake disc is extracted is high.

In order to achieve the necessary lateral run-out in the assembled state for a wheel assembly according to the state of the art, the wheel hub flange on the outer side of the wheel is overtightened together with the wheel bearing on the inner side of the wheel. In this case then the brake disc tolerances accumulate with those of the rim and the tolerances caused by handling, for example, due to uneven tightening of the wheel screws.

The object of the present invention is to provide a wheel assembly that is configured for a motor vehicle and that is as light as possible. Therefore, such a wheel assembly is designed to meet the requirements while at the same time avoiding as many of the aforementioned drawbacks as possible.

The invention achieves this and other objects by providing a wheel assembly that is configured for suspending the wheel of a motor vehicle on one side and that includes a brake disc, which is part of a disc brake and which is fixed, when viewed in the radial direction, to a wheel disc on the outer circumference of the wheel assembly in close vicinity to a wheel rim, the brake caliper of the disc brake surrounding the brake disc over an inner circumference of the brake disc and being fixed to a wheel carrier that supports a stationary ring of a wheel bearing, which has a rotating ring that supports a wheel hub that is connected to the wheel disc in a rotationally and axially fixed manner. The wheel assembly is characterized in that the connection of the wheel disc to the wheel hub is formed by a press fit or by a spur toothing, in particular a Voith Hirth coupling.

In addition, a non-driven wheel can be designed specifically for lateral force, because no driving or braking torques are introduced by way of the wheel disc, a feature that also offers advantages with respect to weight.

Advantageous embodiments of the invention provide that the wheel hub is connected to a drive shaft on the side of the wheel bearing that lies inside the wheel by way of an additional spur toothing, in particular an additional Voith Hirth coupling. Then, the axial prestress of the spur toothing, the additional spur toothing and/or the press fit can be achieved in an advantageous way by use of a screw connection that is accessible on the side of the wheel hub that lies outside the wheel. This arrangement allows the wheel disc to be easily removed by loosening the screw connection. Such a feature significantly simplifies the maintenance work, for example, on the brake.

Preferred embodiments of the invention provide that the brake disc is fastened to the wheel disc in a floating manner or in an elastically flexible manner in the radial direction. This feature can be achieved, for example, by use of a retaining ring, which is elastically flexible in the radial direction and is fixed to the wheel disc. Such a brake disc holder can be easily designed in an elastic manner owing to the low force level of the brake force applied a long way on the outside, a feature that allows the brake disc to expand without restriction in an advantageous way. As a result, a so-called cupping of the brake disc is avoided; and local axial deformations of the wheel disc under lateral force are not transmitted to the brake disc.

If the wheel is split into two functional units so that the wheel screws connect the wheel rim to the wheel disc, then a wheel hub flange that exhibits a significantly enlarged diameter and that also supports the internally surrounded brake disc remains on the vehicle when the wheel is disassembled. Then, when changing the tire, the wheel rim is unscrewed, as the tire carrier, from the wheel disc.

The brake disc can dispense with the securely connected cup and, hence, can be punched advantageously from a sheet, a feature that offers advantages with respect to weight and cost. Moreover, the smaller amount of required clamping force due to the larger friction radius reduces the weight of the brake caliper, whereas the possibility of a large installation space for the brake caliper bridge permits high rigidity in conjunction with less weight. In addition, an improved transmission ratio enables a smaller brake force booster.

In addition, it is advantageous for the wheel rim to be made of an extruded hollow chamber profile. In an especially advantageous embodiment of the invention, the wheel rim and/or the wheel disc can be made of aluminum or magnesium or of a synthetic plastic material, in particular, reinforced with carbon fibers or glass fibers. In this case, the wheel hub and the wheel disc can also be composed of different materials.

The divided construction of the wheel hub and the wheel disc permits a wide scope of design options; and in terms of the structure and materials without the restrictions that are associated with a screw connection of the wheel according to the state of the art. In this case, all of the forces and moments have to be transmitted from the wheel hub flange over the screw connection to the rim. A component connection by way of a press fit or, more specifically, a Voith Hirth coupling, exhibits advantageously a higher stiffness in conjunction with an improved non-positive connection. The rim base can be made of a bent extruded profile, so that the result is that the rim base is also stiffer compared to a conventional rim, because the largest proportion of the material may be found in close vicinity to the neutral fibers. Inexpensive twin rims, for example, for winter tires, are possible or in the case of replacement due to damage, because only the rim band has to be replaced.

The wheel unit and the brake caliper can be configured in such a way that they can be easily replaced, as compared to a wheel or a brake according to the state of the art. As a result, a solution according to the invention can be used, for example, only for high powered vehicles, whereas the less powerful variants can be equipped in parallel with a wheel and brake system according to the state of the art. This arrangement lends itself especially well to expensive wheel designs, such as, for example, wheel designs in carbon fibers. Similarly, retrofitting in the accessory business is also contemplated with this arrangement.

A particularly advantageous embodiment of the invention is characterized in that the wheel bearing is secured over its inner ring on the wheel hub on the inner side of the wheel by means of a cap nut. As an alternative, the wheel bearing can also be secured over its inner ring on the wheel hub on the inner side of the wheel by means of an enlargement of the outer diameter of the wheel hub, in particular by beading. In this case the enlargement of the outer diameter of the wheel hub for securing the wheel bearing can be achieved within the framework of manufacturing the spur toothing on the wheel hub. In particular, this can be done by way of a clamping element within a clamping process for the wheel hub and, in particular, in one working step. Therefore, a connection, which cannot be loosened at least in the case of service, is advantageous, because the receptacle for the brake disc and the receptacle for the rim base can be overtightened in the assembled state with the wheel bearing; and, thus, a maximum amount of lateral run-out is achieved. This applies especially if the brake disc holder and the wheel disc are constructed in one piece. In addition, the elimination of the conventional wheel hub flange makes it possible for the width of the wheel bearing to be larger whereas the diameter of the wheel bearing is smaller, so that the result is less bearing and sealing friction or that the depth of the wheel disc can be larger for high rigidity.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows an exemplary inventive wheel assembly with a cast wheel disc as the non-driven wheel.

DETAILED DESCRIPTION OF THE DRAWINGS

Figure 1:
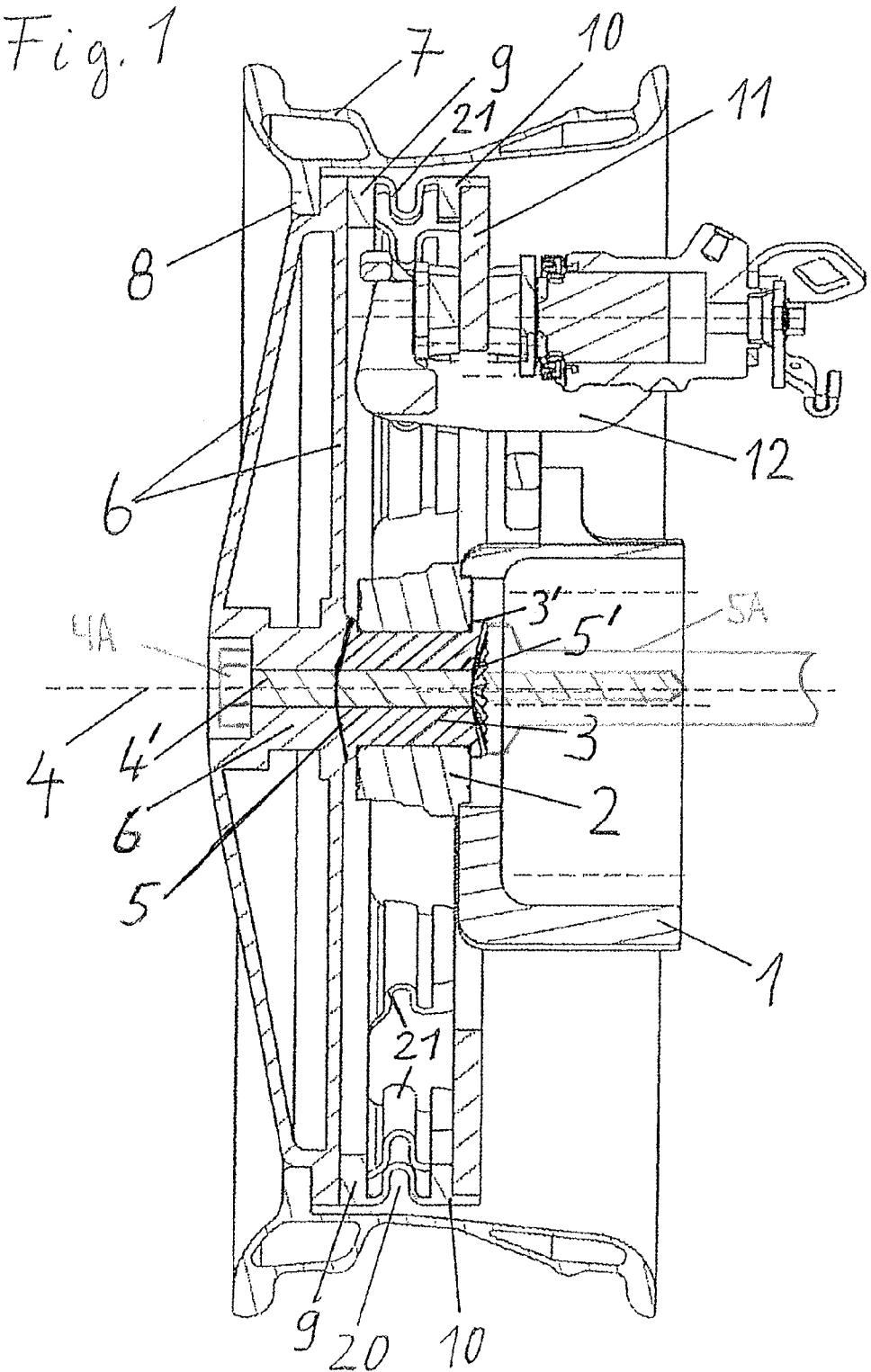
FIG. 1 shows an exemplary inventive wheel assembly with a wheel disc in a metal casting design.

The wheel assembly shown in FIG. 1 is assigned to a wheel carrier 1, which secures an outer ring of a wheel bearing 2, which is shown only partially. The inner ring of the wheel bearing 2 supports a wheel hub 3 in such a way that it can be driven in rotation about an axis 4 that is indicated by the dashed line. The wheel hub 3 is connected to a wheel disc 6 by way of a spur toothing 5, which is configured as a Voith Hirth coupling, in a rotationally and axially fixed manner. The wheel bearing 2 is secured over its inner ring on the wheel hub on the inner side of the wheel by means of an outer diameter 3' of the wheel hub 3 that is enlarged by heading. In this case, the enlarged outer diameter 3' is manufactured within the framework of manufacturing an additional spur toothing 5', in order to connect the wheel hub 3 to a drive shaft 5A. This is done preferably by way of a clamping element (not illustrated) within a clamping process for the wheel hub 3, preferably in one working step. For this reason, the wheel hub 3 is connected to a shaft pin (not illustrated) of the drive shaft by way of the additional spur toothing 5', formed as a Voith Hirth coupling, on the side of the wheel bearing 2 that lies inside the wheel. The axial prestress of the spur toothing 5 and the additional spur toothing 5' is achieved by means of a screw connection that is accessible on the side of the wheel hub 3 that lies outside the wheel. To this end, a push. through screw 4A extends through a drilled hole 4' in the axial direction, screwed to the drive shaft.

The double walled wheel disc 6, which is connected to the aluminum or magnesium wheel hub 3 in such a way that it is secure against torsion, extends on the side outside the wheel in the radial direction as far as a wheel rim 7. The wheel rim 7 is made of an extruded hollow chamber profile, with an inwardly projecting screw connection collar 8, which has drilled holes (not illustrated), by which the wheel rim 7 is connected to a rim carrier ring 9 of a brake disc holder 20 by way of wheel screws, which are not shown, through corresponding drilled holes (not illustrated) on the outer circumference of the wheel disc 6.

The brake disc holder 20 is configured so as to be elastically flexible in the radial direction and carries on its inwardly oriented brake disc receptacle 10 a brake disc 11 of a disc brake having a brake caliper 12 that surrounds or grips the brake disc 11 over its inner circumference and is fixed to the wheel carrier 1. It is possible to design the brake disc holder 20 in such a way that it is elastically flexible in the radial direction by arranging connecting elements 21, which are spaced apart in the circumferential direction, between the rim carrier ring 9 and the brake disc receptacle 10 of the brake disc holder 20 with a U-shaped loop having a wall thickness that is adequately small for the necessary elasticity. As a result, the brake disc holder 20 consists of a rim carrier ring 9, connecting elements 21, which are elastic in the radial direction, and a brake disc receptacle 10.

Figure 2:
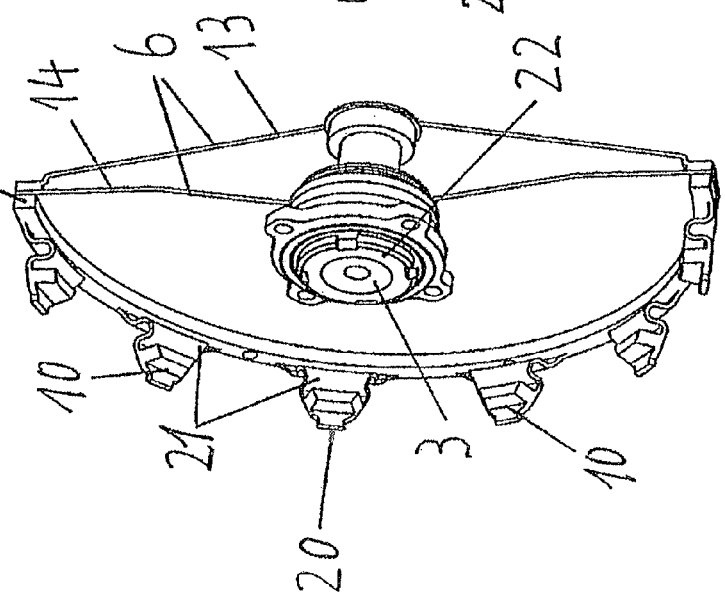
FIG. 2 shows a wheel disc for an exemplary inventive wheel assembly in a sheet metal shell design.

FIG. 2 shows an embodiment of the invention corresponding to FIG. 1, but with the distinct difference that the wheel disc 6, which is connected to the wheel hub 3, is not constructed as a casting, but rather as a sheet metal shell. In order to transmit the torque, a sheet metal shell lying on the outer side of the wheel 13 and a sheet metal shell lying on the inner side of the wheel 14 are securely connected in each instance to the wheel rim 7 and to the rim carrier ring 9, or more specifically the wheel hub 3, on the outer circumference or on the inner circumference, respectively, of the pertinent sheet metal shell. The connection on the outer circumference with the rim, which is not shown, by way of the rim carrier ring 9 with the brake disc holder 20 corresponds to the connection described with respect to FIG. 1. Another difference with respect to FIG. 1 lies also in the securing of the installed wheel bearing 2, which cannot be seen, by way of a cap nut 22 on the wheel hub 3.

Figure 4:
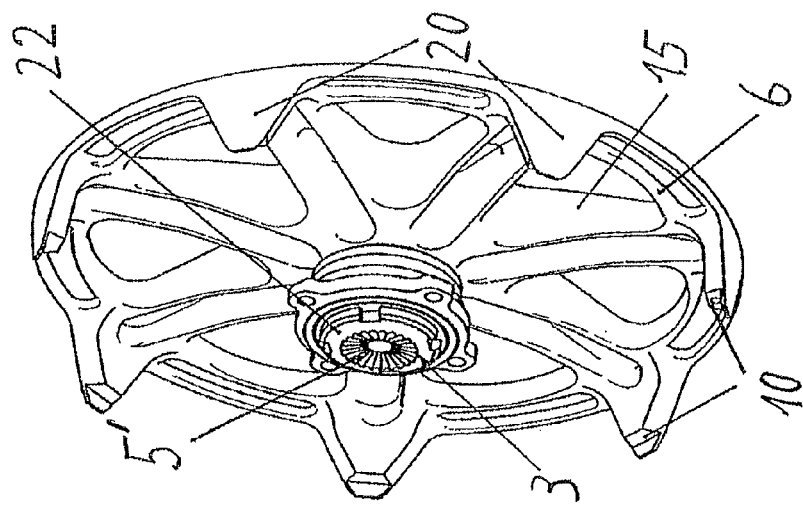
FIG. 4 shows a wheel disc for an exemplary inventive wheel assembly with cast spokes as the driven wheel.
Figure 3:
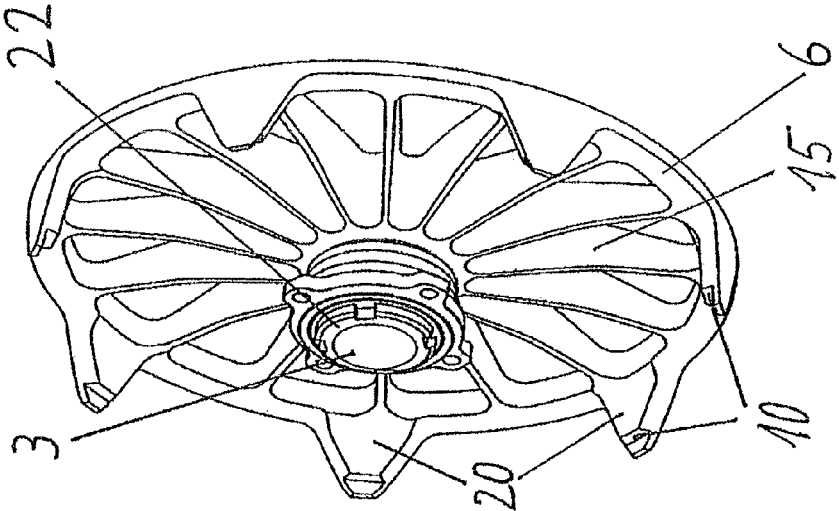
FIG. 3 shows a wheel disc for an exemplary inventive wheel assembly with cast spokes as the non-driven wheel.

This difference with respect to FIG. 1 also exists in FIGS. 3 and 4. Moreover, in addition to FIGS. 1 and 2, FIGS. 3 and 4 also show, in each instance, a wheel disc 6 with wheel spokes 15, connected to a driven and/or following wheel hub 3. The driven wheel hub 3 has the additional spur toothing 5' (FIG. 4). The material for the wheel discs 6, which can be cast or also extruded in molds, can be both a light metal and a synthetic plastic material, in particular, fiber reinforced. In this case the brake disc holder 20 with the brake disc receptacle 10 is constructed in one piece with the wheel disc 6. However, the brake disc could also be fastened in accordance with FIG. 1 by way of a rim carrier ring 9 with the brake disc holder 20. In the one piece design with the wheel disc 6, the adequate elasticity in the radial direction is achieved by means of the choice of wall thickness for the brake disc holders 20 that varies as a function of the material. In the present embodiment, the wheel discs 6 are made of a synthetic plastic material.

Figure 5:
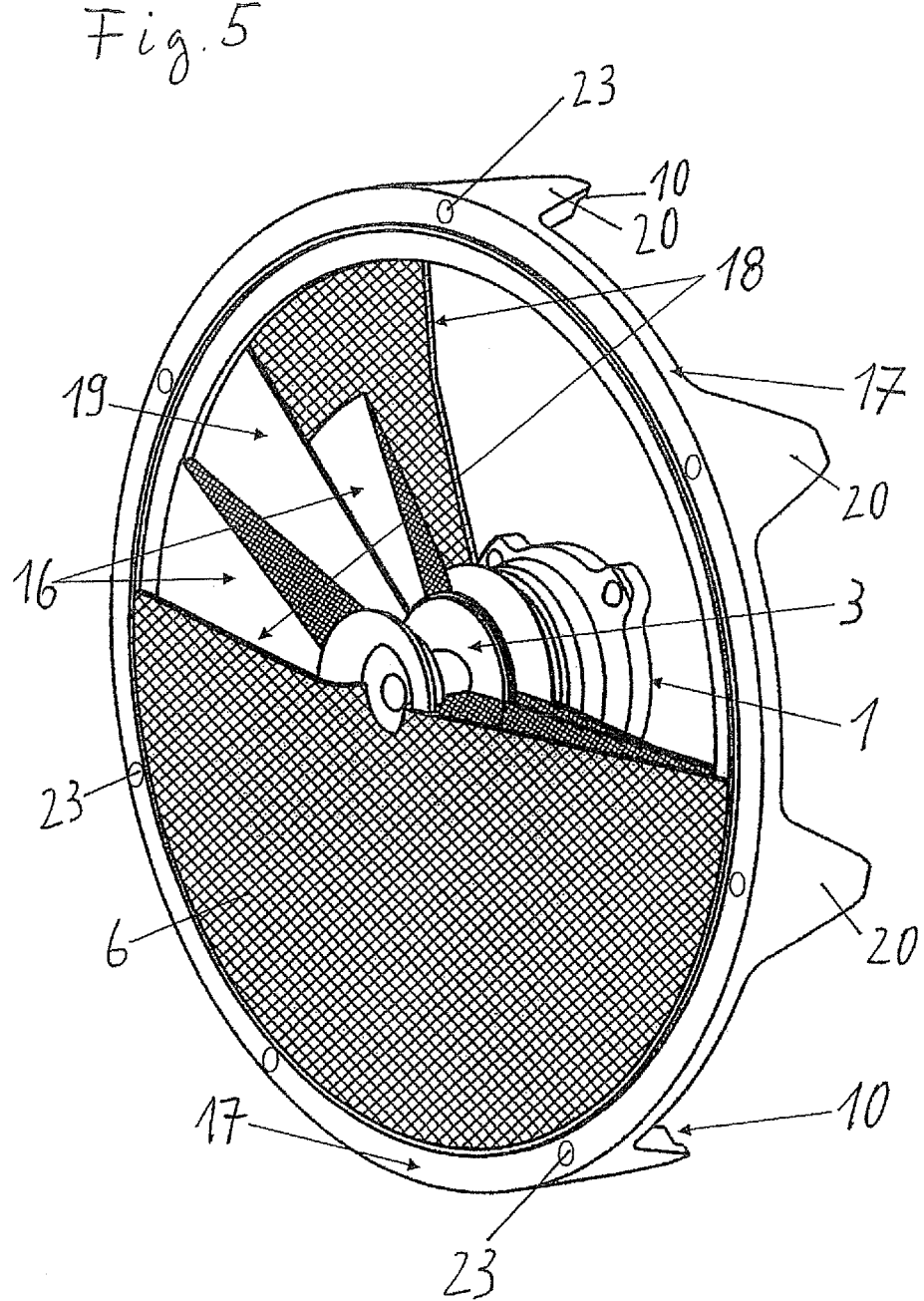
FIG. 5 shows a wheel disc for an exemplary inventive wheel assembly in a sandwich construction.

In contrast, FIG. 5 shows an embodiment of the invention that is constructed of a synthetic plastic material and metal and includes a brake disc receptacle 10 corresponding to that depicted in FIGS. 3 and 4, but with the major difference that the wheel disc 6 is constructed of carbon fiber layers in the manner of a sandwich. The wheel hub 3 and a carrier ring 17 for the wheel rim 7 and the brake disc 11 (neither one is depicted in this figure) are laminated into the wheel disc 6 by means of its plastic shells 18, reinforced with carbon fibers and/or carbon fabric. Between the plastic shells 18 there is a so-called sandwich fill material 16, for example, made of foamed plastic, and a ductile steel sheet inlay 19. As an alternative, the carrier ring 17 can also be constructed in a manner analogous to the rim carrier ring 9 with elastic connecting elements 21 from FIG. 1 at least on the inner side of the wheel, as far as to the brake disc receptacle 10. Otherwise, in the present embodiment, the drilled holes 23, which are not shown anywhere else, can be seen for the wheel screws (not illustrated), with which the wheel rim 7 (FIG. 1) is connected to the carrier ring 17 of the brake disc holder 20 by way of the inwardly projecting screw connection collar 8 of the wheel rim on the outer circumference of the wheel disc 6.

In the case of the non-driven wheel assembly shown in FIG. 6, the wheel hub 3 is fixed by way of the wheel bearing (not illustrated), which may be found at the position of reference numeral 2, to the wheel carrier (not illustrated), which also carries the brake caliper that is not depicted. The inner ring (not illustrated) of the wheel bearing 2 supports the wheel hub 3 in a rotational manner about the axis 4 that is indicated by the dashed line. The wheel hub 3 is connected to the wheel disc 6 by a press fit connection 25 in a rotationally and axially fixed manner. The wheel bearing 2 is secured over its inner ring on the wheel hub on the inner side of the wheel by way of an outer diameter 3' of the wheel hub 3, the outer diameter 3' being enlarged by beading. The axial securing of the press fit connection 25 is achieved with a cap nut 26 by way of a screw connection that is accessible on the side of the wheel hub 3 that lies outside the wheel. With this cap nut, the press fit connection can also be included in the assembly. A driving flange 27 of the wheel hub 3 can extend axially inwards as far as over the wheel bearing 2, so that the result is not only a larger spoke depth but also high tilting rigidity.

The aluminum or plastic wheel disc 6, which is connected by way of the press fit 25 to the wheel hub 3 in such a way that it is secure against torsion, extends on the side outside the wheel in the radial direction as far as a wheel rim 7, which is made of an extruded profile, with an inwardly projecting screw connection collar 8, which is fastened by way of drilled holes 28 by means of screws, which are not shown, on the outer circumference 6' of the wheel disc 6. On the inner side of the wheel, the outer circumference 6' of the wheel disc 6 continues and is connected to the brake disc holder 20 in such a way that it is elastically flexible in the radial direction. The brake disc holder 20 carries on its inwardly oriented brake disc receptacle 10 the brake disc 11 of the disc brake having a brake caliper (not illustrated) that surrounds or grips the brake disc 11 over its inner circumference and is fixed to the wheel carrier that is not shown. The fastening of the brake disc holder 20 in such a way that it is elastically flexible in the radial direction is implemented by use of connecting elements 21 that are spaced apart in the circumferential direction and are arranged between the outer circumference 6' of the wheel disc 6 and the brake disc holder 20 having a wall thickness that is adequately small for the necessary elasticity.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A wheel assembly configured for suspending a wheel of a motor vehicle on one side, the wheel assembly comprising:
   a brake disc, which is part of a disc brake and which is fixed, when viewed in a radial direction, to a wheel disc on an outer circumference of the wheel assembly in close vicinity to a wheel rim, wherein:
   a brake caliper of the disc brake surrounds the brake disc over an inner circumference of the brake disc and is fixed to a wheel carrier that supports a stationary ring of a wheel bearing, the wheel bearing having a rotating ring that supports a wheel hub that is connected to the wheel disc in a rotationally and axially fixed manner;
   the connection of the wheel disc to the wheel hub comprises one of a press fit connection and a Voith-Hirth connection that is substantially within an outer radius of the wheel bearing, and
   the wheel hub is connected on a side of the wheel bearing on the inside of the wheel to a drive shaft by an additional Voith-Hirth coupling.

2. The wheel assembly as claimed in claim 1, wherein axial prestress of said Voith-Hirth connection, the additional Voith-Hirth connection, and/or the press fit connection is achieved by a screw connection accessible on a side of the wheel hub that lies outside the wheel.

3. The wheel assembly as claimed in claim 1, wherein the brake disc is fastened to the wheel disc in at least one of a floating manner and an elastically flexible manner in the radial direction.

4. The wheel assembly as claimed in claim 3, wherein the brake disc is fastened to the wheel disc by a brake disc holder, which is elastically flexible in the radial direction.

5. The wheel assembly as claimed in claim 1, wherein the wheel rim is made of an extruded hollow chamber profile.

6. The wheel assembly as claimed in claim 1, wherein at least one of the wheel rim and the wheel disc is made of one of: aluminum, magnesium, and a synthetic plastic material.

7. The wheel assembly as claimed in claim 6, wherein the synthetic plastic material comprises carbon fiber or glass fiber reinforcement.

8. The wheel assembly as claimed in claim 1, wherein the wheel bearing is secured over its inner ring on the wheel hub on the inner side of the wheel via a cap nut.

9. The wheel assembly as claimed in claim 1, wherein the wheel bearing is secured over its inner ring on the wheel hub on the inner side of the wheel by an enlargement of the outer diameter of the wheel hub.

10. The wheel assembly as claimed in claim 1, wherein the enlargement of the outer diameter of the wheel hub is a beading.

* * * * *